No. 682,297. Patented Sept. 10, 1901.
M. R. TUCKER.
SEAT FOR SEWING MACHINES, &c.
(Application filed Apr. 22, 1901.)
(No Model.)
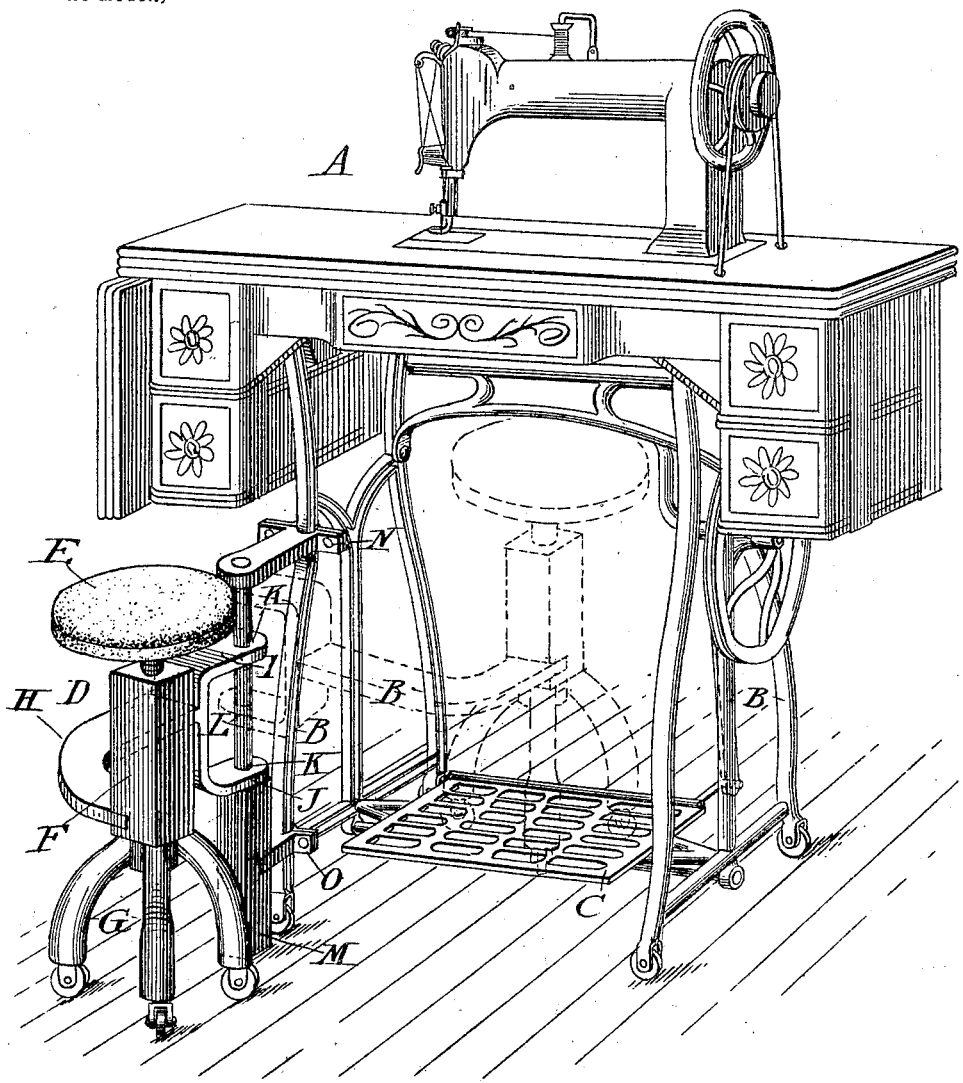
Witnesses:
D. W. Edelin.
Chas. H. Baker.
Inventor.
M. R. Tucker.
By Stebbins & Wright,
Atty's.

UNITED STATES PATENT OFFICE.

MARGARET R. TUCKER, OF RIDERVILLE, ALABAMA.

SEAT FOR SEWING-MACHINES, &c.

SPECIFICATION forming part of Letters Patent No. 682,297, dated September 10, 1901.

Application filed April 22, 1901. Serial No. 56,990. (No model.)

*To all whom it may concern:*

Be it known that I, MARGARET R. TUCKER, a citizen of the United States, residing at Riderville, in the county of Chilton and State of Alabama, have invented new and useful Improvements in Seats for Sewing-Machines and the Like, of which the following is a specification.

The object of my invention is the provision of a seat for sewing-machines and the like which shall be supported by the machine and which can be moved beneath the machine and raised so as to rest upon the pedal and be out of the way when not in use.

My invention consists in certain novelties of construction and combinations of parts hereinafter set forth and claimed.

The accompanying drawing illustrates an example of the physical embodiment of my invention constructed according to the best mode I have so far devised for the practical application of the principle.

The figure shows a sewing-machine with a seat supported by one leg of the same, the said seat being turned outwardly, so as to show the details of construction and relative location of the several parts.

Referring to the drawing, the letter A designates the machine as a whole.

B represents the legs of the machine.

C is the pedal, which occupies a horizontal position.

D is the seat as a whole; E, the adjustable top, which in this instance is provided with a threaded shaft or post of well-known construction, whereby the top can be raised or lowered by revolving the same.

F is a support for the top portion and contains a threaded bearing for the post.

G represents the legs of the seat, each leg having a caster provided with means for retaining the same in position so it will not drop out when the seat is raised.

H is a curved arm secured at one end of the support F in any suitable way.

I designates the upper member of the forked end of the arm. J is the lower member.

K represents holes through the two members of the forked portion of the arm.

L is a post; M, the base of the post; N, the upper clamp, having bolts or screws for holding the same rigidly to one of the legs of the machine and also a hole through which the post L passes, as shown, and O is the lower clamp, rigidly secured to the leg of the machine, above the caster, and also to the base M of the post.

It will be observed that the members I and J of the fork of the arm loosely engage the post L, so that the arm can be moved along with the seat about the post L as a center; also, that the seat and arm can be bodily raised perpendicularly. When in use, the arm J may rest upon the base M, and the fork prevents the seat tipping sidewise. When the seat is not in use, it is moved inwardly and then raised bodily and placed upon the pedal of the machine, as clearly shown by dotted lines in the figure of the drawing.

From the foregoing it becomes obvious that I have provided a seat for sewing-machines and the like which possesses certain novel features and characteristics and adaptabilities for use and disposition when not in use which will be recognized and appreciated.

While I have shown only one example of the physical embodiment of my invention and specific details of construction, I do not intend thereby to limit the scope thereof to such example or details, inasmuch as changes may be introduced which will not constitute a substantial departure.

What I claim as new, and desire to secure by Letters Patent, is—

The combination with a sewing-machine, or the like, having legs, of a seat having fixed legs, a support F, and an arm H having forks I and J, said arm H being secured to the support F; a post L; and clamps N and O; the said clamps rigidly securing the post to a leg of the machine; and the forks I and J of the arm being loosely journaled upon the post and adapted to slide up and down thereupon; the arrangement being such that the seat and arm can be raised bodily and turned to a position under the machine and caused to rest upon the pedal.

In testimony whereof I affix my signature in presence of two witnesses.

MARGARET R. TUCKER.

Witnesses:
 U. E. WAILES,
 RUFYE L. TUCKER.